United States Patent
Tapia

(10) Patent No.: US 9,667,805 B2
(45) Date of Patent: May 30, 2017

(54) PROVIDING DISCOUNTED SERVICE OFFERINGS TO CUSTOMERS EXPERIENCING REDUCED SERVICE AVAILABILITY

(71) Applicant: T-Mobile USA, Inc., Bellevue, WA (US)

(72) Inventor: Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/496,330

(22) Filed: Sep. 25, 2014

(65) Prior Publication Data

US 2016/0094721 A1 Mar. 31, 2016

(51) Int. Cl.
H04W 4/24 (2009.01)
H04W 8/20 (2009.01)
H04M 15/00 (2006.01)

(52) U.S. Cl.
CPC ....... *H04M 15/60* (2013.01); *H04M 15/8016* (2013.01); *H04M 15/8083* (2013.01); *H04W 4/24* (2013.01)

(58) Field of Classification Search
CPC ................................... H04W 4/24; H04W 8/20
USPC .................................................. 455/406, 408
See application file for complete search history.

(56) References Cited

U.S. PATENT DOCUMENTS

| | | | |
|---|---|---|---|
| 6,738,637 B1* | 5/2004 | Marinho | H04W 28/24 455/419 |
| 2005/0164650 A1* | 7/2005 | Johnson | H04L 12/5692 455/95 |
| 2010/0255863 A1* | 10/2010 | Chen | H04L 12/14 455/466 |
| 2011/0137772 A1* | 6/2011 | Davis, III | G06Q 30/016 705/34 |
| 2012/0115433 A1* | 5/2012 | Young | H04L 41/5029 455/406 |
| 2013/0130642 A1* | 5/2013 | Joul | H04L 41/5064 455/406 |
| 2014/0179265 A1* | 6/2014 | Bruns | H04L 12/1492 455/406 |
| 2014/0279460 A1* | 9/2014 | Weiss | G06Q 20/102 705/40 |
| 2014/0337215 A1* | 11/2014 | Howe | G06Q 20/20 705/44 |

* cited by examiner

*Primary Examiner* — Christopher M Brandt
(74) *Attorney, Agent, or Firm* — Lee & Hayes, PLLC

(57) ABSTRACT

An application server described herein receives historical data for a customer of a telecommunication service provider. The historical data may indicate that the customer has experienced reduced service availability from the telecommunication service provider. Based at least in part on the historical data, the application server may determine that the customer qualifies for a discounted service offering. The application server may then provide the discounted service offering to the customer.

19 Claims, 5 Drawing Sheets

US 9,667,805 B2

PROVIDING DISCOUNTED SERVICE OFFERINGS TO CUSTOMERS EXPERIENCING REDUCED SERVICE AVAILABILITY

BACKGROUND

In recent years, wireless network connectivity, such as connectivity to cellular networks of telecommunication service providers, has become available at an increasing number of locations. At some locations, advanced wireless connection technologies, such as Long Term Evolution (LTE), other 4G, and 5G networks have become available.

Service rates offered to customers of telecommunication service providers reflect this range of wireless connection technologies and locations, with customers subscribing to service plans priced to take into account the availability of advanced wireless connection technologies. Some customers, however, may live, work, commute, or travel in an area of reduced service availability, and may be paying for services that they are not able to take full advantage of.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

The disclosure describes herein an application server that receives historical data for a customer of a telecommunication service provider. The historical data may indicate that the customer has experienced reduced service availability from the telecommunication service provider. "Reduced service availability" may be relative to service level(s) associated with a service plan of the customer or relative to a policy of the telecommunication service provider. Based at least in part on the historical data indicating reduced service availability, the application server may determine that the customer qualifies for a discounted service offering. The application server may then provide the discounted service offering to the customer.

Further, the disclosure describes herein an application server that determines that the customer qualifies for the discounted service offering based on a match between historical data or current activity data for the customer and a reduced service availability profile. The reduced service availability profile may reflect historical data of one or more customers which indicates that the one or more customers have experienced reduced service availability from the telecommunication service provider. In some implementations, the reduced service availability profile may be specific to the service plan of the customer.

Figure 1:
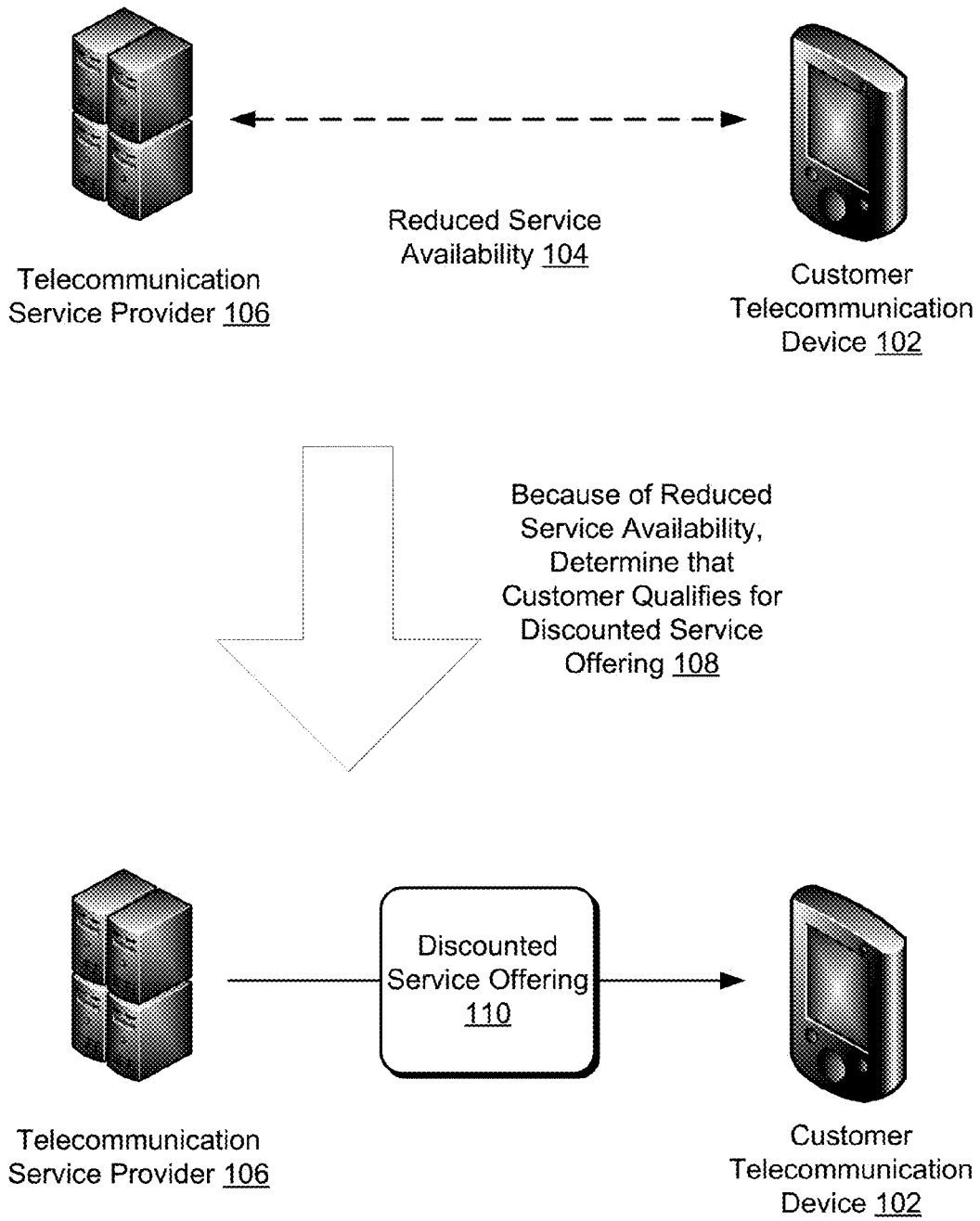
FIG. 1 illustrates an overview of a customer of a telecommunication service provider experiencing reduced service availability and, in response, the telecommunication service provider determining that the customer qualifies for a discounted service offering and providing the discounted service offering to the customer.

FIG. 1 illustrates an overview of a customer of a telecommunication service provider experiencing reduced service availability and, in response, the telecommunication service provider determining that the customer qualifies for a discounted service offering and providing the discounted service offering to the customer. As illustrated, a customer with a customer telecommunication device 102 may experience reduced service availability 104 from a telecommunication service provider 106 at a given location. The reduced service availability 104 may be consistently or inconsistently experienced at the location. For example, the location may include one or more cells of the telecommunication service provider 106 with base stations equipped with legacy (e.g., 3G or 2G) wireless connection technology or which have weaker transmission power (with what is considered weaker varying among different implementations). In another example, the location may include one or more cells of the telecommunication service provider 106 with base stations equipped with packet-switched (e.g., 4G or 5G) wireless connection technology, but heavy utilization of those base stations may occasionally cause devices at the location to experience reduced service availability. In some implementations, reduced service availability may comprise any of wireless connection technology availability, reduced transmission power, reduced quality of service (QoS), etc. relative to a service plan of a customer or to an operator policy.

The customer may typically use his or her customer telecommunication device 102 at home, at work, while community, or at a travel destination. If any of the home, workplace, commute corridor, or travel destination is at a location with reduced service availability 104, the customer may experience reduced service availability 104 at a higher frequency than other customers.

To address the reduced service availability 104, an application server of the telecommunication service provider 106 may receive or retrieve data for the customer, such as historical data and, in some implementations, a customer service plan. Such historical data may include identifications of locations, radio conditions, patterns of use (e.g., dropped calls, truncated services, etc.), histories of purchases at different locations, etc. Based at least in part on the historical data (and, optionally, the customer service plan), the application server may determine 108 that the customer qualifies for a discounted service offering 110. The discounted service offering 110 may include different speed tiers and corresponding prices at corresponding different locations. In some examples, rather than receiving historical data, the application server may receive either or both of historical data or current activity data, determine that the historical data or current activity data matches a reduced service profile, and, based at least in part on the match, determine 108 that the customer qualifies for a discounted service offering 110. The reduced service profile may reflect historical data of one or more customers which indicates that the one or more customers have experienced reduced service availability from the telecommunication service provider. In some implementations, the reduced service availability profile may be specific to the service plan of the customer.

The application server of the telecommunication service provider 106 may then provide the discounted service offering 110 to the customer. Providing the discounted service offering 110 may include texting the customer telecommunication device 102 with the discounted service offering 110, delivering the discounted service offering 110 to a client application of the customer telecommunication device 102, emailing the discounted service offering 110 to an account of the customer, or calling the customer at the customer telecommunication device 102.

Figure 2:
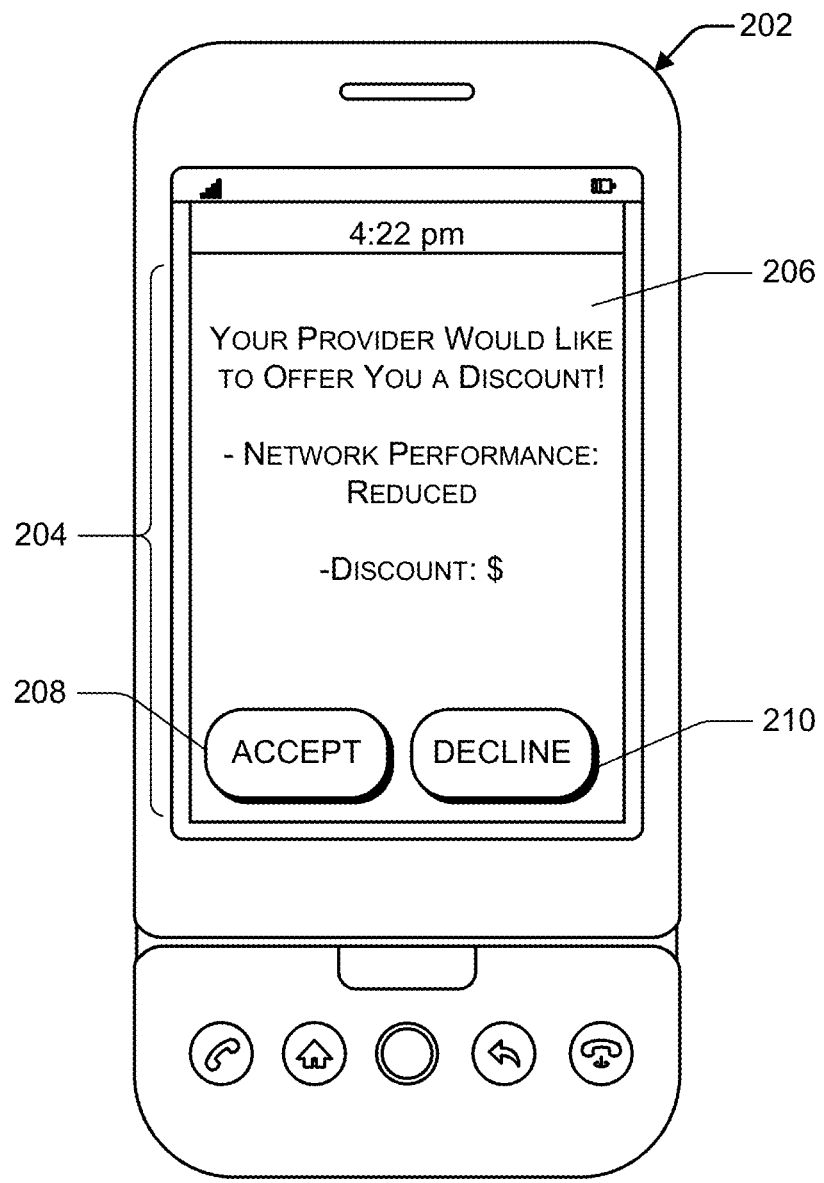
FIG. 2 illustrates an example user interface of a telecommunication device of a customer, the user interface displaying a discounted service offering received from a telecommunication service provider.

FIG. 2 illustrates an example user interface of a telecommunication device of a customer, the user interface displaying a discounted service offering received from a telecommunication service provider. As illustrated, a telecommunication device 202—which may be an example of a customer telecommunication device 102—may include a display user interface 204. The display user interface 204 may display text, graphics, or video of a discounted service offering 206—such as discounted service offering 110. For example, the displayed discounted service offering 206 may include text such as "Your Provider Would Like to Offer You a Discount," as well as indications of network performance, a discounted price, etc.

In some implementations, the display user interface 204 may include selectable display controls, such as accept 208 and decline 210. The customer may select either of the display controls to cause the telecommunication device 202 to respond to the discounted service offering 206. Such selectable options may be offered in any circumstances. For example, if assenting to the discounted service offering 206 may result in a lower quality of service even when higher quality of service is available, it may be desirable to obtain the customer's assent.

In other implementations, application of the discounted service offering 206 may be automatic, and no display controls 208 and 210 may be displayed to the user. In such implementations, the displayed discounted service offering 206 may simply notify the customer that the customer will be paying less for service. Such automatic discounting may be applied in any circumstances. For example, when the customer is not assenting to reduced quality of service when greater quality of service is available, there may be no need to obtain customer assent, as the telecommunication service provider may safely assume that the customer would desire the discount.

Returning to FIG. 1, the application server of the telecommunication service provider 106 may receive assent from the customer telecommunication device 102 to the discounted service offering 110 or may automatically apply a discount offered by the discounted service offering. In both cases, the application server may notify a charging system of the telecommunication service provider 106 to ensure that the customer receives the discount.

Example Environments

Figure 3:
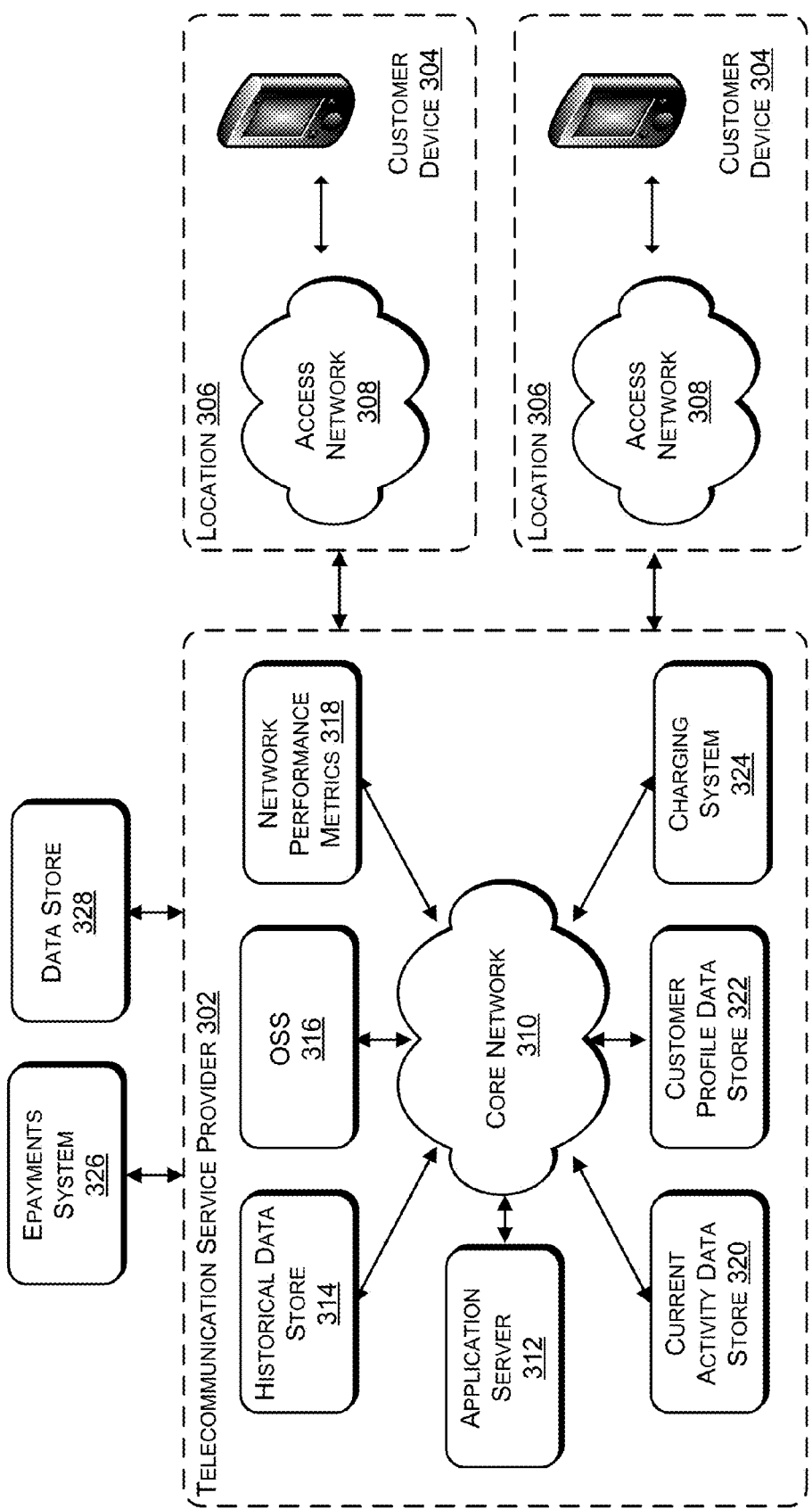
FIG. 3 illustrates an example environment including customers at multiple locations and an application server of a telecommunication service provider to determine, based on data received from any of a number of sources, that one or more of the customers qualifies for a discounted service offering and to provide the discounted service offering to the one or more customers.

FIG. 3 illustrates an example environment including customers at multiple locations and an application server of a telecommunication service provider to determine, based on data received from any of a number of sources, that one or more of the customers qualifies for a discounted service offering and to provide the discounted service offering to the one or more customers. As illustrated, a telecommunication service provider 302 may provide telecommunication services to customer devices 304 at locations 306 though access networks 308 of the telecommunication service provider 302. The telecommunication service provider 302 may include a core network 310 and a number of devices and data stores 312-324 connected through that core network 310. For example, the telecommunication service provider 302 may include an application server 312, a historical data store 314, an operations support system (OSS) 316, a network performance metrics data store 318, a customer activity data store 320, a customer profile data store 322, and a charging system 324 connected through the core network 310. In some implantations, the application server 312 may retrieve data both from data stores of the telecommunication service provider 302 and from external sources, such as the epayments data store 326 and any additional external data stores 328.

In various implementations, the telecommunication service provider 302—which may be an example of a telecommunication service provider 106—may be any sort of provider of cellular networks, other wireless networks, and related services. The telecommunication service provider 302 may offer pre-paid and post-paid service plans for voice services, data services, or both and may also offer pay-per-use rates (per connection, per message, per data unit, etc.) for customers with user accounts with the telecommunication service provider 302. The telecommunication service provider 302 may also operate a telecommunication network or contract with another telecommunication service provider that operates a telecommunication network. Such a telecommunication network may include at least a core network 310 and one or more access networks 308.

In various implementations, the access networks 308 may include base stations (e.g., Node Bs, eNode Bs, etc.) with circuit-switched wireless access technologies, packet-switched wireless access technologies, or both. For example, a given base station of an access network 308 may offer any one or more of LTE connectivity, other 4G connectivity (e.g., High-Speed Data Packet Access (HSDPA)/Evolved High-Speed Packet Access (HSPA+)), 5G connectivity, 3G connectivity (Universal Mobile Telecommunications System (UMTS) technology, Code Division Multiple Access (CDMA) technology, Global System for Mobile Communications (GSM) technology), 2G connectivity, etc. Different base stations of the access networks 308 may offer different wireless access technologies. Each base station may include one or more radio transmitters, such as antennas, that transmit over a part of the radio frequency (RF) spectrum. Further, the access networks 308 may also wireless access points offering wireless connectivity over unlicensed spectrum. Such access point may include, for example, WiFi access points, WiMax access points, etc.

The core network 310 may be a general radio packet services (GPRS) core network, with nodes such as radio network controllers, mobile switching centers, home/visitor location registers, serving GPRS support nodes, gateway GPRS support nodes, etc. Alternatively or additionally, the core network 310 may be or include an evolved packet core (EPC) core network, with nodes such as mobility management entities, home subscriber servers, packet data network gateways, evolved packet data gateways, serving gateways, etc. Further, the core network may implement an Internet Protocol (IP) multimedia service (IMS) layer with a number of IMS nodes.

Further, core network 310 may include a backhaul portion, which may be configured to employ any common wireline communication technology, including but not limited to, optical fiber, coaxial cable, twisted pair cable, Ethernet cable, and power-line cable, along with any common wireless communication technology, such as those described above.

In various implementations, the locations 306 may be any sort of locations, such as home, neighborhoods, buildings, etc. and may be mapped to cells or groups of cells of the telecommunication network of the telecommunication service provider 302. Such cells may have varying sizes, such as macrocells, microcells, picocells, femtocells, etc. Each cell may include a base station, such as the base stations of the access networks 308 described above. These locations 306 and their mapped cells or groups of cells may have pattern of service availability. For example, pattern of service availability may show poor QoS at certain times of day and strong QoS at other times of day. Further the patterns of service availability may be different for different wireless access technologies. And, as mentioned above, some cells or groups of cells may not offer certain wireless access technologies (e.g., LTE). Each customer of the telecommunication service provider 302 may visit different ones of the locations 306 at different times of day and, thus, different customers may experience varying service availabilities.

In further implementations, customers may utilize a wide range of customer devices 304—which may be examples of customer telecommunication devices 102—to access the services of the telecommunication service provider 302 through the access networks 308. These customer devices 304 may comprise any sort of devices, such as cellular phones, smart phones, tablet computers, PCs, laptop computers, electronic readers, media players, gaming devices, etc. Customer devices 304 may also include wearable computing devices, such as watches, wristbands, etc., which may connect to the access networks 308 either directly or through another adjacent customer devices 304. The customer devices 304 may include some sort of output mechanism, such as a display, an audio speaker, or both, to provide a discounted service offering from the telecommunication service provider 302 to the customer. An example user interface rendered to a display is shown in FIG. 2 and described above.

In some implementations, the customer devices 304 accompany their customer users from location 306 to location 306, consuming telecommunication services at these locations 306. While consuming these services, either the customer devices 304 or the access networks 308 that they are connected to may report metrics and identifiers, such as radio conditions, QoS, cell identifiers, etc., associated with the services received by the customer devices 304. These metrics, over time, may show that customers using the customer devices 304 may experienced reduced service availability. Because of this reduced service availability, the customer devices 304 may receive discounted service offerings from the telecommunication service provider 302. These discounted service offerings may vary from customer to customer and may offer different discounts for different levels of reduced service availability. Also, the discounted service offerings received by the customer devices 304 may simply be notifications of discounted already applied or may offer the customers the opportunity to accept or decline the discounts (e.g., because the discounts may be accompanied by an agreement to accept a lower overall service level). If offering the ability to accept or decline, the customer devices 304 may convey answers of the customers to the discounted service offerings.

Figure 4:
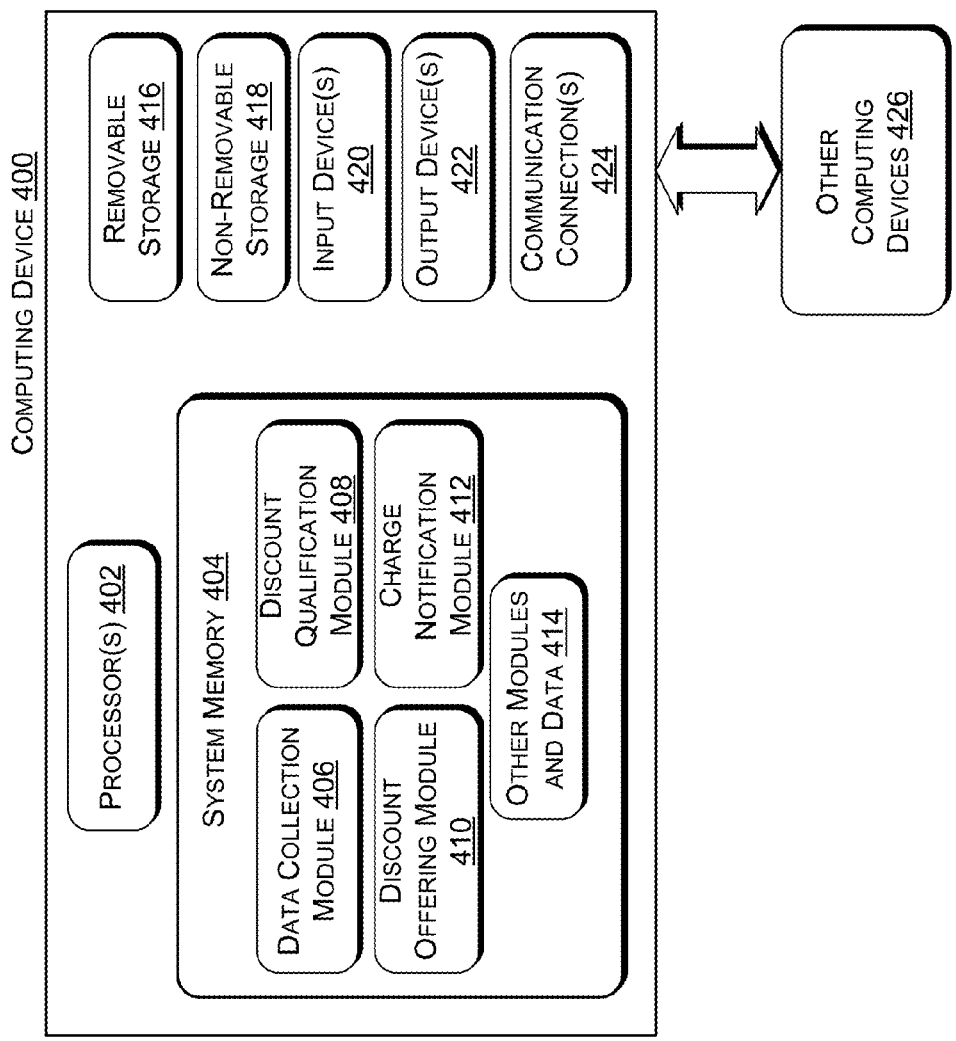
FIG. 4 illustrates an example system architecture of a computing device configured to act as an application server or as one of a number of computing devices serving as an application server.

In various implementations, the devices of the telecommunication service provider 302, such as the application server 312 and the charging system 324 may include one or more computing devices, such as PCs, laptops, work stations, desktop computers, server devices, server farms, main frames, etc. For example, the devices of the telecommunication service provider 302 may individually or collectively comprise a cloud computing network of devices. Alternatively or additionally, the devices of the telecommunication service provider 302 may each comprise a virtual machine on a single device or virtual machines on multiple devices. An example of one of the devices of the telecommunication service provider 302—an example application server 312—is illustrated in FIG. 4 and is described below with reference to that figure.

In further implementations, the data stores of the telecommunication service provider 302, such as the historical data store 314, the network performance metrics data store 318, the customer activity data store 320, and the customer profile data store 322, as well as the external data stores, such as the epayments data store 326 and the other external data store(s) 328, may each represent any one or more data stores. The data stores of the telecommunication service provider 302 and external data stores may each comprise any one or more databases, files, storage structures, etc. and may each be stored on a single device or be distributed across multiple devices.

The OSS 316 may be any sort of OSS and may be configured to perform network inventory, service provisioning, network configuration, fault management, etc.

In various implementations, the application server 312 may determine and provide discounted service offerings on a triggered or automatic basis. For example, the OSS 316 or a self-organizing network (SON) tool may determine that data associated with a customer indicates that customer is experiencing service availability below one or more thresholds and may, in response, trigger the application server 312 to determine whether the customer qualifies for a discounted service offering. Alternatively or additionally, the application server 312 may automatically perform periodic checks for each customer or for groups of customers.

In some implementations, the OSS 316 or a SON tool may utilize the offering of discounted service offerings to improve services offered by the telecommunication service provider 302, identifying locations 306 where improvement may be needed or customer devices 304 routinely exhibiting reduced service availability. Such identifications may be used by the telecommunication service provider 302 to improve network infrastructure, management of network infrastructure, or customer device offerings.

In response to a trigger or initiation of an automatic check, the application server 312 may receive or retrieve historical data for a customer any one or more of a number of sources, such as historical data store 314, OSS 316, epayments data store 326, or other external data stores 328. Also, the application server 312 may retrieve traces or call detail records (CDR) from the historical data source 314, the OSS 316, or from another node or store of the telecommunication service provider 302. The historical data may include locations, radio conditions, or patterns of use (e.g., dropped calls, truncated services, etc.). When historical data is received or retrieved from an epayments data store 326, the historical data may include electronic payment data for payments or attempted payments made at specific locations and times. The application server 312 may also receive identification of a customer service plan, in some implementations (e.g., from the customer profile data store 322).

When the historical data includes locations, the application server 312 may retrieve performance metrics for the access networks 308 associated with those locations. If the historical data includes a time as well as a location, the application server 312 may retrieve performance metrics for the access network 308 associated with that location at or near that specific time. The application server 312 may retrieve the performance metrics from the network performance metrics data store 318.

In various implementations, upon receiving or retrieving the historical data and any associated performance metrics, the application server 312 may determine whether the customer associated with that historical data qualifies for a discounted service offering. The application server 312 may make this determination by applying any one or more rules, thresholds, or models indicative of reduced service availability to the historical data and performance metrics. Such rules, thresholds, or models may be specific to the customer's service plan or may be associated with a policy of the telecommunication service provider 302. There may be a single discounted service offering associated with the rules, thresholds, or models, or multiple discounted service offerings with different features may be associated with different rules, thresholds, or models. The discounted service offerings may each include, for example, different speed tiers and corresponding prices at corresponding different locations.

Alternatively or additionally, in response to a trigger or initiation of an automatic check, the application server 312 may receive or retrieve historical data for a customer any one or more of a number of sources, such as those describe above, may receive or retrieve current activity data from the current activity data store 320 or from another store, or may receive or retrieve both historical data and current activity data. Example historical data is described above. Current activity data may include current locations or current radio conditions.

When the historical data or current activity data includes locations, the application server 312 may retrieve performance metrics for the access networks 308 associated with those locations. If the historical data or current activity data includes a time as well as a location, the application server 312 may retrieve performance metrics for the access network 308 associated with that location at or near that specific time. The application server 312 may retrieve the performance metrics from the network performance metrics data store 318.

Upon receiving or retrieving historical data, current activity data, or performance metrics, the application server 312 may determine whether that data or metrics matches a reduced service availability profile stored in the customer profile data store 322. Such a reduced service availability profile may be specific to the customer's service plan or may be associated with a policy of the telecommunication service provider 302. The reduced service availability profile may reflect historical data of one or more customers which indicates that the one or more customers have experienced reduced service availability from the telecommunication service provider. Matching may be determined by the application server 312 through use of a similarity score or other mechanism.

In further implementations, upon determining a match between the data or metrics and a reduced service availability profile, the application server 312 may determine whether the customer associated with the data or metrics qualifies for a discounted service offering. The application server 312 may make this determination by determining whether the matching reduced service availability profile is associated with a discounted service offering. There may be a single discounted service offering associated with a single reduced service availability profile, a single discounted service offering associated with multiple reduced service availability profiles, or multiple discounted service offerings with different reduced service availability profiles. The discounted service offerings may each include, for example, different speed tiers and corresponding prices at corresponding different locations, as described above.

In various implementations, the application server 312 may provide the determined discounted service offering to the customer by sending the discounted service offering to the customer through the customer's customer device 304. This may include texting the discounted service offering to the customer, emailing the discounted service offering to the customer, calling the customer device 304, or delivering the discounted service offering as a message to a client application of the customer device 304.

In some implementations, the discount of the discounted service offering may be automatically applied, without requiring assent from the customer. In such implementations, the provided discounted service offering may simply be a notification. In other implementations, e.g. when the discounted service offering is associated with agreement to a reduced level of service even when a higher level of service is available, the provided discounted service offering may ask the customer to accept or decline the discounted service offering, and the application server 312 may receive the response from the customer device 304 though, e.g., the telecommunication network of the telecommunication service provider 302.

Upon automatically applying the discounted service offering or receiving the customer's assent, the application server 312 may notify the charging system 324 to enable the charging system 324 to appropriately bill the customer based on the discount provided by the discounted service offering.

Example Devices

FIG. 4 illustrates an example system architecture of a computing device 400 configured to act as an application server, such as an application server 312, or as one of a number of computing devices serving as an application server. As illustrated, the computing device 400 comprises processor(s) 402 and a system memory 404 storing a data collection module 406, a discount qualification module 408, a discount offering module 410, a charge notification module 412, and other modules and data 414. Also, the computing device 400 includes a removable storage 416, a non-removable storage 418, input device(s) 420, output device(s) 422, and communication connections 424 to one or more other computing devices 426.

In some implementations, the processor(s) 402 include a central processing unit (CPU), a graphics processing unit (GPU), or both CPU and GPU, or any other sort of processing unit.

In various examples, system memory 404 may be volatile (such as RAM), non-volatile (such as ROM, flash memory, etc.) or some combination of the two. The data collection module 406 may include any one or more components configured to receive or retrieve historical data, current activity data, network performance metrics, or reduced service availability profiles from one or more data stores and sources, such as data stores and sources 314-322, 326, and 328. The discount qualification module 408 may include any one or more components configured to determine, based on data, metrics, and profiles received or retrieved by the data collection module 406 whether a customer qualifies for a discounted service offering. The discount offering module 410 may include any one or more components configured to provide a discounted service offering to a customer and to receive a response to the offering from the customer. The charge notification module 412 may include any one or more components configured to interface with a charging system, such as charging system 324, to notify the charging system of the discount provided to the customer. The other modules and data 414 may include any operating system or application components or data. While the modules and data 406-414 are shown on a single computing device 400, it is to be understood that the modules and data 406-414 may be implemented across multiple devices, such as multiple devices of an application server 312.

The computing device 400 may also include additional data storage devices (removable and/or non-removable) such as, for example, magnetic disks, optical disks, or tape. Such additional storage is illustrated in FIG. 4 by removable storage 416 and non-removable storage 418.

Non-transitory computer-readable media may include volatile and nonvolatile, removable and non-removable tangible, physical media implemented in technology for storage of information, such as computer readable instructions, data structures, program modules, or other data. System memory 404, removable storage 416 and non-removable storage 418 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 400. Any such non-transitory computer-readable media may be part of the computing device 400.

In various examples, input devices 420 may include any sort of input devices known in the art. For example, input devices 420 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

In some examples, the output devices 422 may include any sort of output devices known in the art, such as a display (e.g., a liquid crystal display), speakers, a vibrating mechanism, or a tactile feedback mechanism. Output devices 422 may also include ports for one or more peripheral devices, such as headphones, peripheral speakers, or a peripheral display.

Computing device 400 also contains communication connections 424 that allow the computing device 400 to communicate with other computing devices 426, such as other nodes and data stores 312-324 of a telecommunication service provider 302, devices of a core network 310, devices of an access network 308, customer devices 304, data stores 326 or 328, other devices of a telecommunication service provider 106, or customer telecommunication devices 102.

Example Processes

Figure 5:
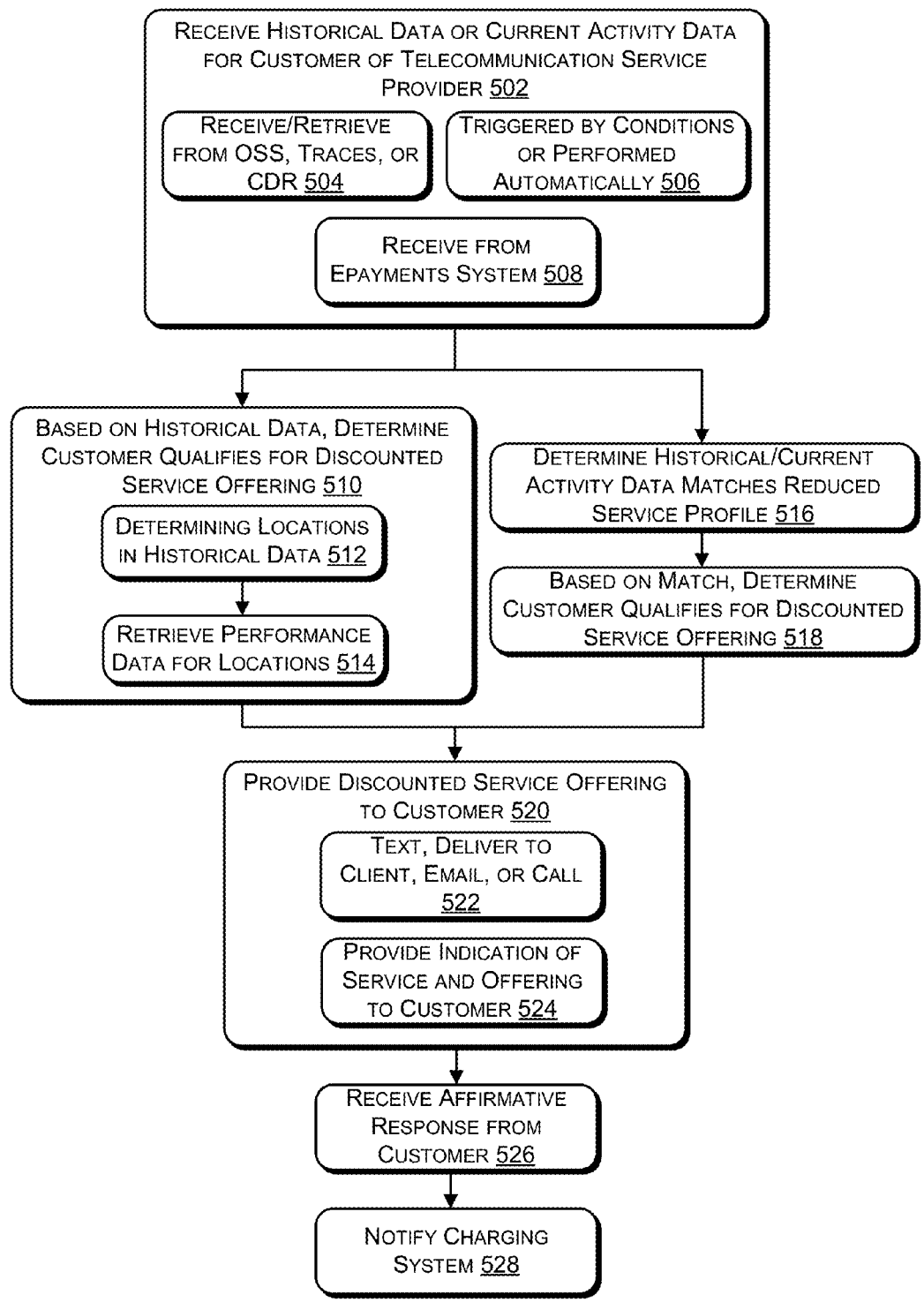
FIG. 5 illustrates a flow chart of an example process for receiving data for a customer, determining, based on the data or on a profile matched to the data, that the customer qualifies for a discounted service offering, and providing the discounted service offering to the customer.

FIG. 5 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates a flow chart of an example process for receiving data for a customer, determining, based on the data or on a profile matched to the data, that the customer qualifies for a discounted service offering, and providing the discounted service offering to the customer. The process may include, at 502, receiving, by an application server, historical data or current activity data for a customer of a telecommunication service provider. The data may indicate that the customer has experienced reduced service availability from the telecommunication service provider. Historical data may include at least one of a location, radio conditions, or a pattern of use (e.g., dropped calls, truncated services, etc.). Current activity data may include at least one of a current location or current radio conditions. The process may also include receiving identification of a customer service plan. At 504, the receiving may include receiving or retrieving the historical data from an OSS, from traces, or from CDR. At 506, the receiving may be triggered by one or more conditions or may be automatically performed on a periodic basis. At 508, the receiving may alternatively or additionally include receiving the historical data from an electronic payments system. In such examples, the historical data may include electronic payment data for payments or attempted payments made at specific locations and times.

At 510, the application server may then determine that the customer qualifies for a discounted service offering based at least in part on the historical data. The discounted service offering may include different speed tiers and corresponding prices at corresponding different locations. The determining may further be based on the customer service plan. At 512, the determining may include determining one or more locations of a telecommunication network of the telecommunication service provider referenced in the historical data. At 514, the application server may receive or retrieve performance data for those determined one or more locations. The performance data or the historical data may indicate the reduced service availability.

Alternatively to the determining at 510, the application server may, at 516, first determine that the historical data or the current activity data match a reduced service availability profile. The reduced service availability profile may reflect historical data of one or more customers which indicates that the one or more customers have experienced reduced service availability from the telecommunication service provider. In some implementations, the reduced service availability profile may be specific to the customer service plan. At 518, based at least in part on the determined match, the application server may determine that the customer qualifies for a discounted service offering.

At 520, the application server may provide the discounted service offering to the customer. At 522, the providing may include texting the customer, delivering a message to a client application of a device of the customer, emailing the customer, or calling the customer. At 524, the providing may include providing an indication of the reduced service availability and the discounted service offering to the customer.

At 526, the application server may receive an affirmative response from the customer accepting the discounted service offering. At 528, the application server may then notify a charging system of the telecommunication service provider of the affirmative response.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, by an application server, historical data for a customer of a telecommunication service provider, wherein the historical data indicates that the customer is experiencing a reduced service availability from the telecommunication service provider;
   based at least in part on the historical data, determining, by the application server, that the customer qualifies for a discounted service offering, the discounted service offering including at least different speed tiers and corresponding prices at corresponding different locations and an indication of an overall reduced service level; and
   responsive to determining that the customer qualifies for the discounted service offering, providing, by the application server, the discounted service offering to the customer,
   wherein the discounted service offering includes further service at the overall reduced service level for a reduced price.

2. The method of claim 1, wherein the receiving comprises receiving or retrieving the historical data from an operations support system (OSS), from traces, or from call detail records (CDR).

3. The method of claim 1, wherein the receiving is triggered by one or more conditions or is automatically performed on a periodic basis.

4. The method of claim 1, wherein the historical data includes at least one of a location, radio conditions, or a pattern of use.

5. The method of claim 1, wherein the receiving comprises receiving the historical data from an electronic payments system and the historical data includes electronic payment data from payments or attempted payments made at specific locations and times.

6. The method of claim 1, wherein the determining comprises determining one or more locations of a telecommunication network of the telecommunication service provider referenced in the historical data and receiving or retrieving performance data for the one or more locations.

7. The method of claim 6, wherein either the performance data or the historical data indicate the reduced service availability.

8. The method of claim 1, wherein the providing the discounted service offering to the customer comprises texting the customer, delivering a message to a client application of a device of the customer, emailing the customer, or calling the customer.

9. The method of claim 1, wherein the providing includes providing an indication of the reduced service availability and the discounted service offering to the customer.

10. The method of claim 1, further comprising receiving an affirmative response from the customer accepting the discounted service offering and notifying a charging system of the telecommunication service provider of the affirmative response.

11. One or more non-transitory computer-readable media having programming instructions stored thereon that, when executed by an application server, cause the application server to perform operations comprising:
    receiving current activity data for a customer of a telecommunication service provider;
    determining that or the current activity data matches a reduced service availability profile, the reduced service availability profile reflecting historical data of one or more customers which indicates that the one or more customers have experienced reduced service availability from the telecommunication service provider;
    based at least in part on the determining that the current activity data matches the reduced service availability profile, determining that the customer qualifies for a discounted service offering, the discounted service offering including at least different speed tiers and corresponding prices at corresponding different locations and an indication of an overall reduced service level; and
    responsive to determining that the customer qualifies for the discounted service offering, providing the discounted service offering to the customer,
    wherein the discounted service offering includes further service at the overall reduced service level for a reduced price.

12. The one or more non-transitory computer-readable media of claim 11, wherein the receiving comprises receiving or retrieving the current activity data from an operations support system (OSS), from traces, or from call detail records (CDR).

13. The one or more non-transitory computer-readable media of claim 11, wherein the current activity data includes at least one of a location, radio conditions, or a pattern of use.

14. The one or more non-transitory computer-readable media of claim 11, wherein the current activity data includes at least one of a current location or current radio conditions.

15. The one or more non-transitory computer-readable media of claim 11, wherein the providing the discounted service offering to the customer comprises texting the customer, delivering a message to a client application of a device of the customer, emailing the customer, or calling the customer.

16. An application server comprising:
    one or more processors;
    a memory device coupled to the one or more processors, the memory device storing computer-executable instructions that, when executed by the one or more processors, cause the one or more processors to:
       receive historical data for a customer of a telecommunication service provider, wherein the historical data A) indicates that the customer has experienced a reduced service availability from the telecommunication service provider and B) is associated with a customer location, the customer location being one of a home of the customer, a workplace of the customer, commute corridor of the customer, or travel destination of the customer;

determine that the customer qualifies for a discounted service offering based at least in part on the historical data, wherein the historical data indicates that the customer location is associated with greater reduced service availability than that experienced by customers at different locations, and the discounted service offering including at least different speed tiers and corresponding prices at corresponding different locations and an indication of an overall reduced service level; and provide the discounted service offering to the customer, wherein the discounted service offering includes further service at the overall reduced service level for a reduced price.

17. The application server of claim 16, wherein the memory device further stores computer-executable instructions that, when executed by the one or more processors, cause the one or more processors to retrieve telecommunication network performance data for one or more locations.

18. The application server of claim 16, wherein the memory device further stores computer-executable instructions that, when executed by the one or more processors, cause the one or more processors to receive an affirmative response from the customer accepting the discounted service offering and notify a charging system of the telecommunication service provider of the affirmative response.

19. The application server of claim 16, wherein the historical data is received from an electronic payments system and the historical data includes electronic payment data from payments or attempted payments made at specific locations and times.

* * * * *